(12) United States Patent
Gupta et al.

(10) Patent No.: US 10,885,019 B2
(45) Date of Patent: Jan. 5, 2021

(54) INTER-REVIEWER CONFLICT RESOLUTION

(71) Applicant: International Business Machines Corporation, Armonk, NY (US)

(72) Inventors: Nitin Gupta, Saharanpur (IN); Ankush Gupta, Haridwar (IN); Vijay Ekambaram, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 163 days.

(21) Appl. No.: 16/163,289

(22) Filed: Oct. 17, 2018

(65) Prior Publication Data

US 2020/0125658 A1 Apr. 23, 2020

(51) Int. Cl.
*G06F 17/00* (2019.01)
*G06F 16/23* (2019.01)
(Continued)

(52) U.S. Cl.
CPC ...... *G06F 16/2365* (2019.01); *G06F 16/3329* (2019.01); *G06F 16/353* (2019.01); *G06N 20/00* (2019.01)

(58) Field of Classification Search
CPC .............. G06F 16/2365; G06F 16/353; G06F 16/3329; G06N 20/00
See application file for complete search history.

(56) References Cited

U.S. PATENT DOCUMENTS 7,007,232 B1 2/2006 Ross et al.
7,234,131 B1 6/2007 Speyrer et al.
(Continued)

FOREIGN PATENT DOCUMENTS

WO WO2017051425 A1 3/2017

OTHER PUBLICATIONS

Liu, Ming & Calvo, Rafael & Rus, Vasile. (2012). G-Asks: an Intelligent Automatic Question Generation System for Academic Writing Support. Dialogue and Discourse. 3. 101-124. 10.5087/dad. 2012.205. (Year: 2012).*

(Continued)

*Primary Examiner* — Syed H Hasan
(74) *Attorney, Agent, or Firm* — Ference & Associates LLC

(57) ABSTRACT

One embodiment provides a method, including: receiving a plurality of review comments from each of a plurality of reviewers tasked with reviewing a document; categorizing each of the plurality of review comments into one of a plurality of review topics; identifying a conflict between a first review comment provided by one of the plurality of reviewers and a second review comment provided by another of the plurality of reviewers, wherein the identifying a conflict comprises (i) identifying a sentiment of the first review comment and a sentiment of the second review comment and (ii) determining that the sentiment of the first review comment and the sentiment of the second review comment are different; and generating a question set comprising a plurality of questions based upon a conflict identified for a review comment of the corresponding reviewer, wherein the corresponding reviewer answering the generated question resolves the conflict.

16 Claims, 2 Drawing Sheets

(51) Int. Cl.
  *G06N 20/00* (2019.01)
  *G06F 16/35* (2019.01)
  *G06F 16/332* (2019.01)

(56) References Cited

U.S. PATENT DOCUMENTS

| | | | |
|---|---|---|---|
| 7,895,275 B1 | 2/2011 | Evans et al. | |
| 2003/0164849 A1 | 9/2003 | Barrie et al. | |
| 2005/0004950 A1* | 1/2005 | Ciaramitaro | G06Q 10/10 |
| 2009/0210444 A1 | 8/2009 | Bailey et al. | |
| 2009/0228323 A1* | 9/2009 | Ebrahimian | G06Q 10/06 |
| | | | 705/321 |
| 2010/0235403 A1* | 9/2010 | Ney de Souza | G06Q 10/10 |
| | | | 707/802 |
| 2011/0257961 A1* | 10/2011 | Tinkler | G09B 7/06 |
| | | | 704/9 |
| 2013/0346128 A1* | 12/2013 | Kibbe | G06Q 10/101 |
| | | | 705/7.13 |
| 2014/0365207 A1* | 12/2014 | Convertino | G06F 40/30 |
| | | | 704/9 |
| 2016/0110789 A1 | 4/2016 | Gilb | |

OTHER PUBLICATIONS

Tennant, Jonathan P. et al., "A multi-disciplinary perspective on emergent and future innovations in peer review", F1000Research, 2017, 38 pages, F1000Research.

Keith, Brian et al., "A Hybrid Approach for Sentiment Analysis Applied to Paper Reviews", KDD '17, Halifax, Nova Scotia, Canada, 2017, 10 pages.

Rothwell, Peter M. et al., "Reproducibility of peer review in clinical neuroscience—Is agreement between reviewers any greater than would be expected by chance alone?", Brain 2000, 6 pages, Oxford University Press.

Editorial, "Judging the judges: the role of journal editors", Q J Med, 2002, 6 pages, Association of Physicians.

\* cited by examiner

INTER-REVIEWER CONFLICT RESOLUTION

BACKGROUND

When documents (e.g., technical papers, grant proposals, manuscripts, presentations, etc.) are prepared by one or a group of people, they are generally reviewed by one or more reviewers. Sometimes each of the reviewers is responsible for reviewing a certain feature or aspect of the document. For example, one or a group of reviewers may be responsible for reviewing the document for technical accuracy, whereas another reviewer or group of reviewers is responsible for reviewing the document for novelty. Alternatively, all of the reviewers may be responsible for reviewing all aspects or features of the document.

Each reviewer may have a different style of reviewing and/or may expect different features or aspects to be presented in a particular manner. For example, one reviewer may provide detailed comments or questions on aspects of the document, whereas another reviewer may provide short comments without much substance. As another example, one reviewer may expect all related documents or works to be cited within a document, whereas another reviewer may only expect the most closely related documents or works to be cited within a document. As another example, one reviewer may provide more subjective comments, whereas another reviewer may provide more objective comments.

BRIEF SUMMARY

In summary, one aspect of the invention provides a method comprising: receiving a plurality of review comments from each of a plurality of reviewers tasked with reviewing a document; categorizing, for each of the plurality of reviewers, each of the plurality of review comments into one of a plurality of review topics; identifying a conflict between (a) a first review comment categorized into a review topic and provided by one of the plurality of reviewers and (b) a second review comment categorized into the same review topic and provided by another of the plurality of reviewers, wherein the identifying a conflict comprises (i) identifying a sentiment of the first review comment and a sentiment of the second review comment and (ii) determining that the sentiment of the first review comment and the sentiment of the second review comment are different; and generating, for each of the plurality of reviewers, a question set comprising a plurality of questions based upon a conflict identified for a review comment of the corresponding reviewer, wherein the corresponding reviewer answering the generated question resolves the conflict.

Another aspect of the invention provides an apparatus, comprising: at least one processor; and a computer readable storage medium having computer readable program code embodied therewith and executable by the at least one processor, the computer readable program code comprising: computer readable program code configured to receive a plurality of review comments from each of a plurality of reviewers tasked with reviewing a document; computer readable program code configured to categorize, for each of the plurality of reviewers, each of the plurality of review comments into one of a plurality of review topics; computer readable program code configured to identify a conflict between (a) a first review comment categorized into a review topic and provided by one of the plurality of reviewers and (b) a second review comment categorized into the same review topic and provided by another of the plurality of reviewers, wherein the identifying a conflict comprises (i) identifying a sentiment of the first review comment and a sentiment of the second review comment and (ii) determining that the sentiment of the first review comment and the sentiment of the second review comment are different; and computer readable program code configured to generate, for each of the plurality of reviewers, a question set comprising a plurality of questions based upon a conflict identified for a review comment of the corresponding reviewer, wherein the corresponding reviewer answering the generated question resolves the conflict.

An additional aspect of the invention provides a computer program product, comprising: a computer readable storage medium having computer readable program code embodied therewith, the computer readable program code executable by a processor and comprising: computer readable program code configured to receive a plurality of review comments from each of a plurality of reviewers tasked with reviewing a document; computer readable program code configured to categorize, for each of the plurality of reviewers, each of the plurality of review comments into one of a plurality of review topics; computer readable program code configured to identify a conflict between (a) a first review comment categorized into a review topic and provided by one of the plurality of reviewers and (b) a second review comment categorized into the same review topic and provided by another of the plurality of reviewers, wherein the identifying a conflict comprises (i) identifying a sentiment of the first review comment and a sentiment of the second review comment and (ii) determining that the sentiment of the first review comment and the sentiment of the second review comment are different; and computer readable program code configured to generate, for each of the plurality of reviewers, a question set comprising a plurality of questions based upon a conflict identified for a review comment of the corresponding reviewer, wherein the corresponding reviewer answering the generated question resolves the conflict.

A further aspect of the invention provides a method, comprising: obtaining a plurality of document evaluation comments from each of a plurality of evaluators corresponding to evaluation of a document; classifying each of the evaluation comments into one of a plurality of evaluation topics, wherein the classifying comprises extracting phrases from the evaluation comments and classifying the extracted phrases; detecting, for each of the evaluation topics, a disagreement between a first evaluation comment provided by one of the plurality of reviewers and a second evaluation comment provided by another of the plurality of reviewers, wherein the detecting comprises detecting a contrasting sentiment between the first and second evaluation comments; generating, for each of the plurality of evaluators, a minimal question set to resolve the disagreement between the evaluation comments; and providing the minimal question set to the corresponding evaluator.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
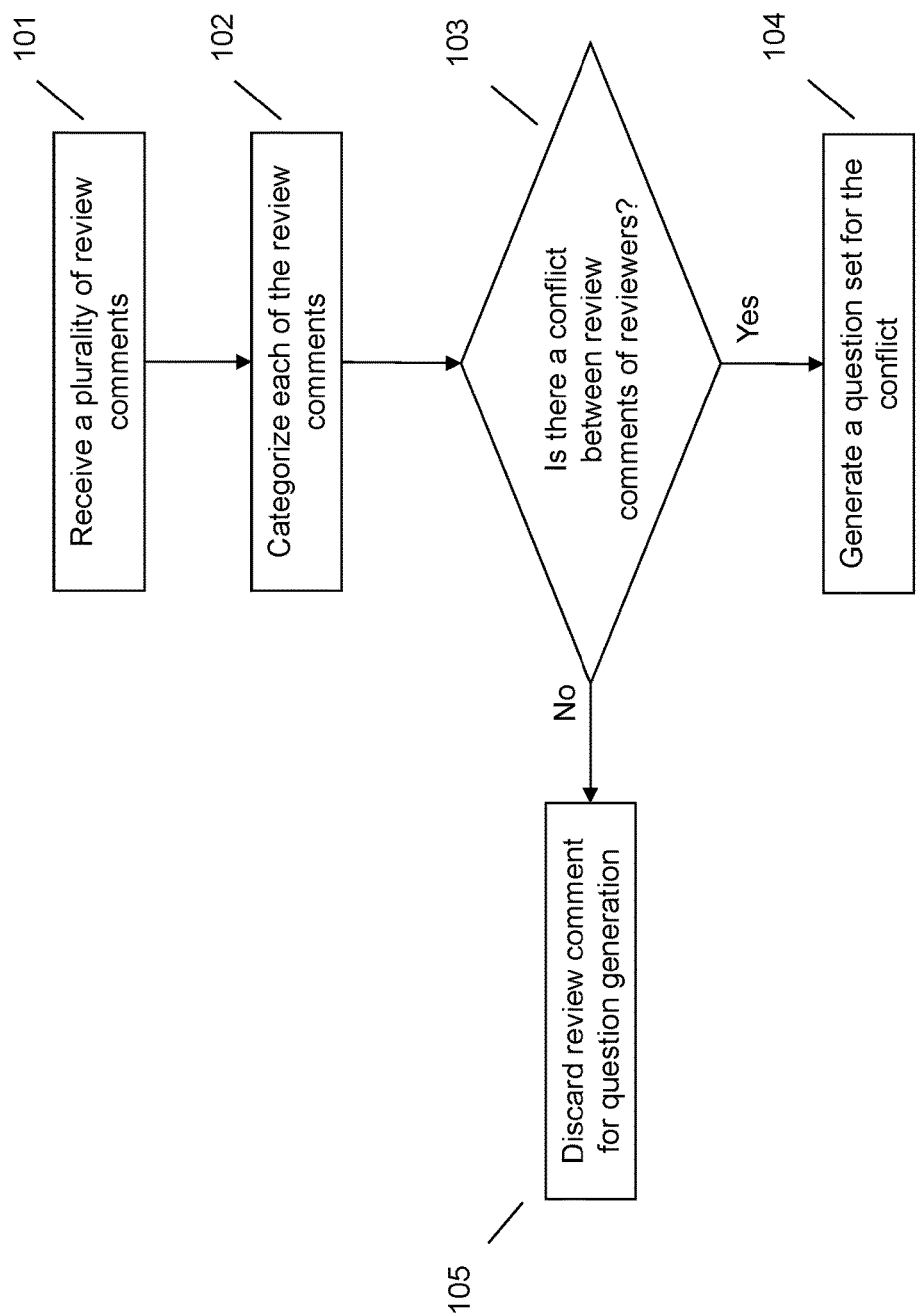
FIG. 1 illustrates a method of resolving inter-reviewer conflicts by generating a minimal question set for each of the reviewers.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 2. In accordance with an example embodiment, all of the process steps, components and outputs discussed with respect to FIG. 1 can be performed or utilized by way of a processing unit or units and system memory such as those indicated, respectively, at 16' and 28' in FIG. 2, whether on a server computer, a client computer, a node computer in a distributed network, or any combination thereof.

Since different reviewers provide comments to documents differently, it can be difficult for the person or group of people receiving the comments to determine what changes need to be made in order to resolve the comments. For example, a reviewer may indicate that the document does not include novel features, but does not indicate what novel features are missing or why the reviewer thinks that the novel features are missing. In other words, the reviewer may provide an overall general comment without any supporting details explaining the reasoning behind the comment. Additionally, a reviewer could provide comments that conflict with comments provided by other reviewers. For example, one reviewer may indicate that the document accurately captures the technical details, and another reviewer may indicate that the document fails to capture all the technical details.

To resolve these inter-reviewer conflicts conventionally requires back-and-forth between the reviewers and/or the document drafter. This process can be very time consuming and requires a significant effort from all parties. For example, it may be difficult to get all parties together to communicate in a single session, so the communications must occur through another medium that requires multiple hours or days to resolve. Additionally, if the reviewers have to communicate through a textual medium, it may take many communications to fully convey or understand a point being made by the reviewer. Thus, the conventional technique for resolving comments is very time consuming, labor intensive, and inefficient.

Accordingly, the techniques and systems as described herein provide a system and technique for resolving inter-reviewer conflicts by generating a minimal question set for each of the reviewers that, upon receiving responses to the question set, will resolve the conflicts. The system receives a plurality of comments from each of a plurality of reviewers that are tasked with reviewing a document. The system can then categorize the comments into one of a plurality of review topics, for example, novelty, technical details, relevance, or the like. The system may further categorize the comments into finer-grained topics, for example, novelty 1, novelty 2, or the like.

The system can then identify conflicts between comments provided by different reviewers that are categorized into the same topic. For example, the system may analyze the sentiment of each of the comments to determine whether the comment has a positive, negative, or neutral sentiment. If the sentiments of two or more comments are different across reviewers, the system may determine that there is a conflict between the review comments provided by the reviewers. Identification of a conflict may also include identifying comments provided by reviewers that are lacking in substance. In other words, a conflict may be identified if a comment is a subjective comment without any supporting reasoning for the provided comment. From the identified conflicts and subjective comments, the system can automatically generate a minimal question set for each of the reviewers. These question sets are generated in a manner such that an answer to the question set resolves the conflicts between the reviewers. In other words, the system automatically generates the least number of questions for each of the reviewers that results in resolution of the conflicts once the reviewer has provided a response to each of the questions in the question set.

Such a system provides a technical improvement over current systems for document review by providing a technique that can automatically generate a minimal question set for each reviewer, where reviewer responses to the question set will resolve any conflicts between reviewer comments. The system categorizes comments made by reviewers and can identify conflicts between comments made by different reviewers. Based upon these conflicts, which also include comments that need additional detail, the system can automatically generate natural language questions to be presented to each reviewer that are designed to resolve the conflicts. Thus, instead of the conventional system which is time consuming, labor extensive, and inefficient, the described system provides an efficient technique for resolution of reviewer comments.

FIG. 1 illustrates a method for resolving inter-reviewer conflicts by generating a minimal question set for each of the reviewers that, upon receiving responses to the question set, will resolve the conflicts. At 101 the system receives a plurality of review comments from each of a plurality of reviewers who are tasked with reviewing a document. In other words, the system receives multiple review comments from each of the document reviewers. Receiving the review comments may include each of the reviewers or another user providing comments to a central system, uploading comments, or the like. Alternatively, receipt of the review comments may include a user providing a document that includes review comments to the system, for example, by uploading a reviewed/commented document, providing access to the reviewed/commented document, or the like.

At 102 the system may categorize each of the review comments for each of the reviewers. In other words, the system maintains identification of the reviewer who provided the comment and categorizes each of the comments provided by a single reviewer. The system performs the same categorization for each of the remaining reviewers. To categorize the comments the system may first categorize the comments into one of a plurality of review topics. The review topics may be dependent on the document type. For example, a document for a grant proposal may include a funding topic, whereas a document for a technical presentation may not include a funding topic. Alternatively, the topics may be provided by a user and the system may simply categorize each of the comments based upon the provided topics. Some possible high-level topics include novelty, related words, results, relevance, writing style, mathematical formulation, and the like. A user can also customize the topics based upon the setting of the document, for example, the user may choose different topics for documents being presented at a symposium versus a document being submitted to a journal. If a single comment includes different portions that appear to belong to different topics, the system may break up the comment into the different portions and categorize each of those portions. Alternatively, the system may simply duplicate the comment across the multiple topics so that the comment appears in all applicable topics.

The system may also perform a fine-tuned categorization where each of the comments provided within a single high-level categorization are further classified or categorized into more specific or detailed topics. For example, the system may further classify or categorize comments provided in the novelty topic into technical or non-technical novelty topics. In either the high-level categorization or the fine-tuned categorization the system may use a deep learning technique to classify phrases of the review comments into different topics. Thus, to perform the categorization the system may use natural language processing to identify words and phrases within the comments and also to identify syntactic and/or syntax roles of the words or phrases within the comments. The system can then use either deep learning techniques or dictionary based matching to classify the identified words or phrases into different topics.

At 103 the system determines whether there is a conflict between review comments of different reviewers. The conflict analysis is performed within the different topics. In other words, the system analyzes all the comments provided by different reviewers that have been categorized into a particular review topic. Within each of these topics, the system determines if there are any conflicts between the comments provided by different reviewers. To identify if any conflicts exist the system performs a sentiment analysis on each of the comments within the topic and categorizes the sentiment of the comment. For example, the system may categorize a comment as having a positive sentiment, a negative sentiment, a neutral sentiment, or the like. If the comment has multiple parts, each having a different sentiment, the system may break the comment into different portions and then sentimentally categorize each of the portions. Sentiment analysis may be performed using natural language processing techniques and/or a sentiment model that is unique to the topic. In other words, the sentiment model that determines the sentiment of the comment may be unique to each topic so that a more accurate sentiment conclusion can be determined.

Once the system has performed the sentiment analysis for each of the comments within the topic, the system compares the sentiment of comments within the topic provided by different reviewers. In other words, the system is trying to determine if different reviewers provided conflicting comments. Thus, the system compares the sentiment of comments within a topic provided by one reviewer against the sentiment of comments within the same topic provided by another reviewer. If the sentiment of the comments provided by reviewers is different, the system may determine that a conflict exists between the review comments provided by the different reviewers. For example, the system may identify a conflict if a review comment provided by one reviewer and categorized into one topic has a negative sentiment and a review comment provided by a different reviewer and categorized into the same topic has a neutral sentiment. As another example, the system may identify a conflict if a review comment provided by one reviewer and categorized into one topic has a positive sentiment and a review comment provided by a different reviewer and categorized into the same topic has a negative sentiment.

The system may also identify a conflict within a single comment provided by a reviewer. An example of such a conflict is when the comment is a subjective comment that includes no supporting detail for the comment. In other words, if a reviewer provides an overall general comment but does not provide any reasoning or details for the comment, the system can identify this comment as having a conflict even though it is not in direct conflict with a comment provided by another reviewer. In order to identify a comment that is subjective with little detail or reasoning, the system can generate a question from the comment. Generation of the question may be performed using deep learning methods or models. Once the question is generated, the system may analyze the comment to determine if the answer to the question appears in the comment. In other words, the system can treat the comment as a question-answer generation problem. If the answer does appear within the comment, the system can discard that question. If answers appear to all generated questions, then the system can categorize the comment as a proper subjective comment having details and/or reasoning. If the comment does not include answers to some of the questions, the system can mark the comment as non-explained and, therefore, as a comment having a conflict.

Another example of detection of a conflict which does not include a direct conflict with another reviewer's comment is a comment that requires extra validation. A comment that requires extra validation is a comment that indicates that something is missing, incorrect, or the like, and requires a person to verify or validate whether the information is actually missing or incorrect. These extra validation conflicts can be identified using a deep learning method or model or natural language processing technique to analyze the comment and identify that the comment can be categorized as a validation comment.

If the system determines that there is not a conflict at 103, the system may discard the review comment for question generation at 105. In other words, if the system determines that a review comment does not need additional input by a reviewer, the system will not use that comment for question generation.

If, on the other hand, the system determines there is a conflict at 103, the system will generate a question set based upon the conflict at 104. The system will generate a question set for each of the reviewers based upon conflicts identified that correspond to the reviewer. In other words, the system generates unique question sets for each of the reviewers. The unique question sets may contain some of the same questions across reviewers. However, a question set for one reviewer will not be identical to a question set for another reviewer. The system attempts to generate a minimal question set for each of the reviewers. A minimal question set is a question set that has the fewest number of questions that are necessary for resolving the identified conflicts. This helps to reduce the number of questions presented to the reviewers, thereby providing a more efficient system. The question sets includes questions where a response provided by the reviewer would resolve the identified conflict. In other words, the generated questions are those questions necessary for resolving the conflict.

Generation of the minimal question set is based upon the conflicts identified from the sentiment analysis, the subjective review analysis, and the extra validation analysis. In other words, the system generates questions that can resolve any of the conflicts identified from the sentiment analysis, subjective review analysis, and the extra validation analysis. To generate the questions the system uses a deep learning model that is trained for question generation based upon the identified conflicts. From the model the system can generate questions using a natural language processing technique so that the questions are provided in a manner understandable by the reviewer, specifically, a natural language question. Before presentation to the reviewers, the system may reduce the questions to a subset of minimal questions.

To produce the minimal questions the system may first validate the generated questions against identified parameters. These parameters may be based upon a submission setting for the document, for example, a symposium, a grant proposal, a presentation, a technical manual, or the like. Each of the submission settings may have different features or aspects that are expected within a submitted document. For example, one submission setting may require more technical details than another submission setting. Thus, based upon the submission setting, the system may determine that some of the questions are irrelevant. In other words, if a generated question would request additional details that are not necessary for the submission setting, the system may identify that question as irrelevant and discard that question. Another technique for reducing the number of questions may be to compare the questions against other generated questions to determine if the answer to one of the questions would also answer the other question. In this case, the system may identify one of the questions as redundant and discard that question. The system may also compare questions generated across reviewers to determine if some of those questions would be redundant and may then discard one of the redundant questions. In other words, if an answer provided by one reviewer would answer a question generated for another reviewer, the system may identify one of those questions as redundant and discard that question.

Thus, the described system and method provide an improvement over conventional system for document review by providing a system that can automatically generate minimal question sets for each of the reviewers such that responses to the question sets resolve any conflicts or subjective comments that were identified. Such a system provides a technique that is less time consuming, less labor intensive, and more efficient than conventional manual techniques that require many communications between reviewers and/or document drafters.

Figure 2:
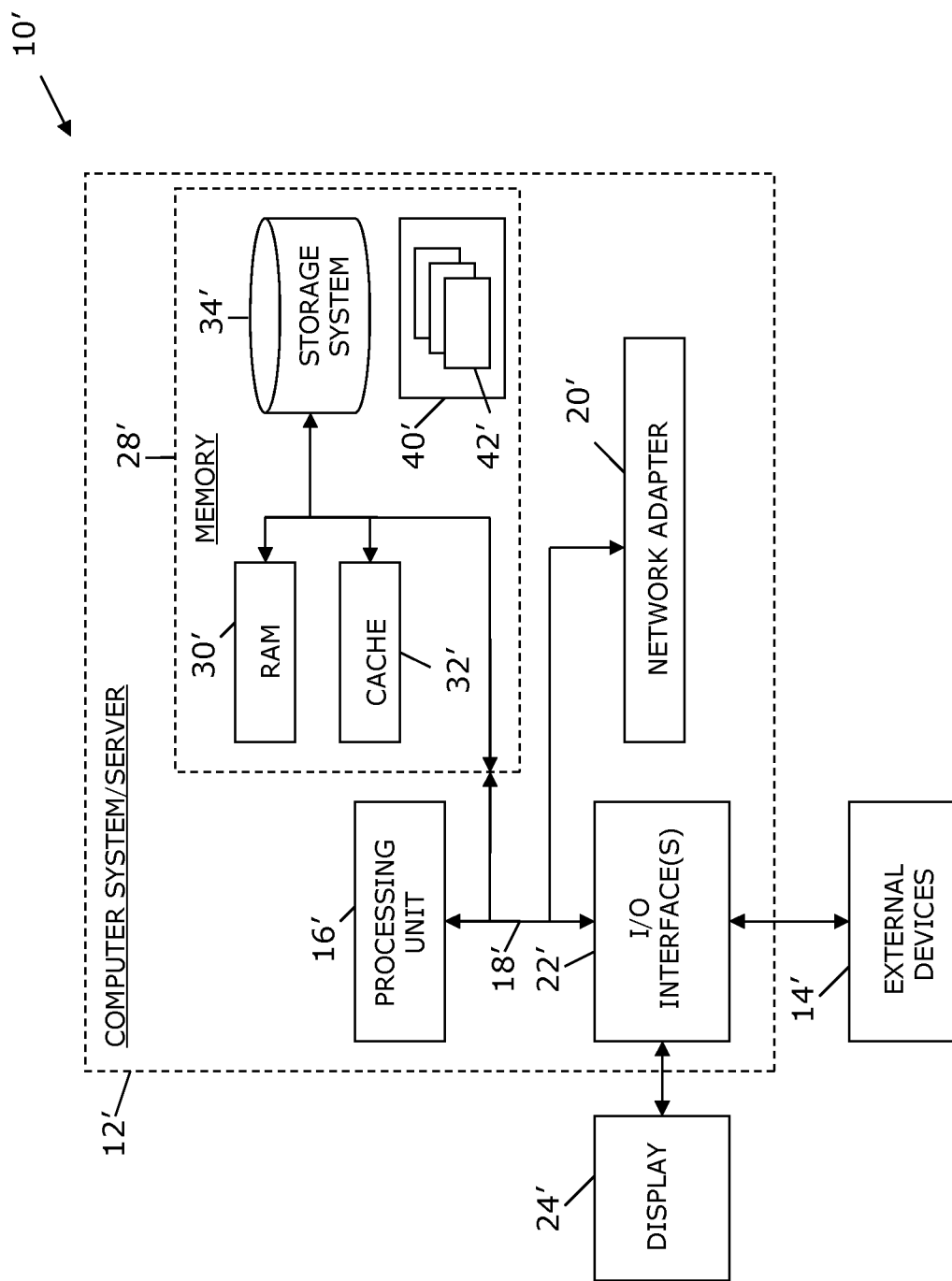
FIG. 2 illustrates a computer system.

As shown in FIG. 2, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
receiving a plurality of review comments from each of a plurality of reviewers tasked with reviewing a document;
categorizing, for each of the plurality of reviewers, each of the plurality of review comments into one of a plurality of review topics;
identifying a plurality of conflicts, each of the plurality conflicts being between (a) a first review comment categorized into a review topic and provided by one of the plurality of reviewers and (b) a second review comment categorized into the same review topic and provided by another of the plurality of reviewers, wherein the identifying a conflict comprises (i) identifying a sentiment of the first review comment and a sentiment of the second review comment and (ii) determining that the sentiment of the first review comment and the sentiment of the second review comment are different; and
generating a plurality of question sets, each comprising a plurality of questions and each generated for one of the plurality of reviewers, the plurality of question sets being generated based upon the plurality of conflicts identified from the plurality of review comments, wherein a reviewer of the plurality of reviewers answering a question of the question set provided to the reviewer resolves a conflict related to the question; wherein each of the plurality of question sets comprises a minimal question set comprising a fewest number of questions that resolve the identified plurality of conflicts, wherein generating each of the minimal question sets comprises generating a first question set, determining, by validating the first question set against identified parameters, at least a subset of questions present in the first question set are irrelevant, identifying redundant questions within the first question set and across other first question sets generated for other of the plurality of reviewers, and removing the at least a subset of questions and the redundant questions to generate the minimal question set.

2. The method of claim 1, wherein the categorizing comprises categorizing each of the review comments into a high level review topic and further categorizing the review comments into more specific review topics.

3. The method of claim 1, wherein the categorizing comprises using a deep learning technique to classify phrases of the plurality of review comments into a review topic.

4. The method of claim 1, wherein the generating a question set comprises (i) detecting subjective review comments within the categorized review comments and (ii) generating a question requesting more information related to the subjective review comments.

5. The method of claim 1, wherein the generating a question set comprises (i) detecting, from the categorized review comments, a review comment from a given reviewer that needs to be validated by another of the plurality of reviewers and (ii) generating a question, for at least one of the reviewers other than the given reviewer, requesting validation of the review comment.

6. The method of claim 1, wherein the generating a question set comprises using a natural language processing technique to generate a natural language question.

7. The method of claim 1, wherein the identified parameters are identified based upon a submission setting for the document.

8. The method of claim 1, comprising (i) examining the review comments for an answer to a generated question and (ii) discarding a question for which an answer has previously been provided.

9. An apparatus, comprising:
at least one processor; and
a computer readable storage medium having computer readable program code embodied therewith and executable by the at least one processor, the computer readable program code comprising:
computer readable program code configured to receive a plurality of review comments from each of a plurality of reviewers tasked with reviewing a document;
computer readable program code configured to categorize, for each of the plurality of reviewers, each of the plurality of review comments into one of a plurality of review topics;
computer readable program code configured to identify a plurality of conflicts, each of the plurality conflicts being between (a) a first review comment categorized into a review topic and provided by one of the plurality of reviewers and (b) a second review comment categorized into the same review topic and provided by another of the plurality of reviewers, wherein the identifying a conflict comprises (i) identifying a sentiment of the first review comment and a sentiment of the second review comment and (ii) determining that the sentiment of the first review comment and the sentiment of the second review comment are different; and
computer readable program code configured to generate a plurality of question sets, each comprising a plurality of questions and each generated for one of the plurality of reviewers, the plurality of question sets being generated based upon the plurality of conflicts identified from the plurality of review comments, wherein a reviewer of the plurality of reviewers answering a question of the question set provided to the reviewer resolves a conflict related to the question;
wherein each of the plurality of question sets comprises a minimal question set comprising a fewest number of questions that resolve the identified plurality of conflicts, wherein generating each of the minimal question sets comprises generating a first question set, determining, by validating the first question set against identified parameters, at least a subset of questions present in the first question set are irrelevant, identifying redundant questions within the first question set and across other first question sets generated for other of the plurality of reviewers, and removing the at least a subset of questions and the redundant questions to generate the minimal question set.

10. A computer program product, comprising:
a computer readable storage medium having computer readable program code embodied therewith, the computer readable program code executable by a processor and comprising:
computer readable program code configured to receive a plurality of review comments from each of a plurality of reviewers tasked with reviewing a document;
computer readable program code configured to categorize, for each of the plurality of reviewers, each of the plurality of review comments into one of a plurality of review topics;
computer readable program code configured to identify a plurality of conflicts, each of the plurality conflicts being between (a) a first review comment categorized into a review topic and provided by one of the plurality of reviewers and (b) a second review comment categorized into the same review topic and provided by another of the plurality of reviewers, wherein the identifying a conflict comprises (i) identifying a sentiment of the first review comment and a sentiment of the second review comment and (ii) determining that the sentiment of the first review comment and the sentiment of the second review comment are different; and
computer readable program code configured to generate a plurality of question sets, each comprising a plurality of questions and each generated for one of the plurality of reviewers, the plurality of question sets being generated based upon the plurality of conflicts identified from the plurality of review comments, wherein a reviewer of the plurality of reviewers answering a question of the question set provided to the reviewer resolves a conflict related to the question;
wherein each of the plurality of question sets comprises a minimal question set comprising a fewest number of questions that resolve the identified plurality of conflicts, wherein generating each of the minimal question sets comprises generating a first question set, determining, by validating the first question set against identified parameters, at least a subset of questions present in the first question set are irrelevant, identifying redundant questions within the first question set and across other first question sets generated for other of the plurality of reviewers, and removing the at least a subset of questions and the redundant questions to generate the minimal question set.

11. The computer program product of claim 10, wherein the categorizing comprises categorizing each of the review comments into a high level review topic and further categorizing the review comments into more specific review topics.

12. The computer program product of claim 10, wherein the generating a question set comprises (i) detecting subjective review comments within the categorized review comments and (ii) generating a question requesting more information related to the subjective review comments.

13. The computer program product of claim 10, wherein the generating a question set comprises (i) detecting, from the categorized review comments, a review comment from a given reviewer that needs to be validated by another of the plurality of reviewers and (ii) generating a question, for at least one of the reviewers other than the given reviewer, requesting validation of the review comment.

14. The computer program product of claim 10, wherein the generating a question set comprises using a natural language processing technique to generate a natural language question.

15. The computer program product of claim 10, comprising (i) examining the review comments for an answer to a generated question and (ii) discarding a question for which an answer has previously been provided.

16. A method, comprising:
obtaining a plurality of document evaluation comments from each of a plurality of evaluators corresponding to evaluation of a document;
classifying each of the evaluation comments into one of a plurality of evaluation topics, wherein the classifying comprises extracting phrases from the evaluation comments and classifying the extracted phrases;
detecting, for each of the evaluation topics, a plurality of disagreements, each of the plurality of disagreements being between a first evaluation comment provided by one of the plurality of reviewers and a second evaluation comment provided by another of the plurality of reviewers, wherein the detecting comprises detecting a contrasting sentiment between the first and second evaluation comments;
generating, based upon the plurality of disagreements, a plurality of minimal question sets comprising a fewest number of questions that resolve the disagreement between the evaluation comments, each of the plurality of minimal question sets comprising a plurality of questions and each generated for one of the plurality of evaluators, wherein generating each of the plurality of minimal question sets comprises generating a first question set, determining, by validating the first question set against identified parameters, at least a subset of questions present in the first question set are irrelevant, identifying redundant questions within the first question set and across other first question sets generated for other of the plurality of evaluators, and removing the at least a subset of questions and the redundant questions to generate the minimal question set; and
providing each of the minimal question sets to a corresponding evaluator.

* * * * *